US011535366B2

(12) United States Patent
Thalheimer (10) Patent No.: US 11,535,366 B2
(45) Date of Patent: Dec. 27, 2022

(54) SHIFTING A CENTER OF GRAVITY OF AN AIRCRAFT

(71) Applicant: Aurora Flight Sciences Corporation, a subsidiary of The Boeing Company, Manassas, VA (US)

(72) Inventor: William Cooper Thalheimer, Cambridge, MA (US)

(73) Assignee: AURORA FLIGHT SCIENCES CORPORATION, A SUBSIDIARY OF THE BOEING COMPANY, Manassas, VA (US)

( * ) Notice: Subject to any disclaimer, the term of this patent is extended or adjusted under 35 U.S.C. 154(b) by 324 days.

(21) Appl. No.: 16/830,119

(22) Filed: Mar. 25, 2020

(65) Prior Publication Data

US 2021/0300527 A1    Sep. 30, 2021

(51) Int. Cl.
*B64C 17/02* (2006.01)
*B64C 29/00* (2006.01)

(52) U.S. Cl.
CPC .......... *B64C 17/02* (2013.01); *B64C 29/0025* (2013.01); *B64C 29/0033* (2013.01)

(58) Field of Classification Search
CPC ...................................................... B64C 17/02
See application file for complete search history.

(56) References Cited

U.S. PATENT DOCUMENTS

| 10,099,783 B1 * | 10/2018 | Nilson | B64C 17/02 |
| 10,543,905 B1 * | 1/2020 | Kwon | B64D 27/24 |
| 10,604,237 B2 * | 3/2020 | Voss | B64C 39/066 |
| 11,225,323 B2 * | 1/2022 | Stanney | B64C 17/02 |
| 2020/0031464 A1 * | 1/2020 | Shafir | B64C 17/02 |
| 2021/0047029 A1 * | 2/2021 | Stanney | B64C 3/56 |

FOREIGN PATENT DOCUMENTS

| CN | 106828886 A | * | 6/2017 | |
| EP | 3511242 A1 | * | 7/2019 | |
| FR | 3083774 A1 | * | 1/2020 | ............. B64C 17/00 |
| WO | WO-2017021391 A1 | * | 2/2017 | ............. B64C 17/00 |

OTHER PUBLICATIONS

"PteroDynamics Transwing," Electric VTOL News, Available Online at https://evtol.news/aircraft/pterodynamics-transwing/, Retrieved on Feb. 5, 2020, 5 pages.

* cited by examiner

*Primary Examiner* — Joseph W Sanderson
(74) *Attorney, Agent, or Firm* — Alleman Hall Creasman & Tuttle LLP (57) ABSTRACT

According to one aspect of the present disclosure, an apparatus for shifting a center of gravity of an aircraft is disclosed. The apparatus includes a propulsion component, a moveable ballast component, and an assembly configured to translate the moveable ballast component. The propulsion component is configured to assist in transitioning the aircraft between a first mobility phase and a second mobility phase. The assembly is configured to translate the moveable ballast component between an aft position and a forward position of the aircraft based on the aircraft transitioning between the first mobility phase and the second mobility phase to shift the center of gravity of the aircraft along a longitudinal axis of the aircraft.

20 Claims, 10 Drawing Sheets

SHIFTING A CENTER OF GRAVITY OF AN AIRCRAFT

FIELD

The present disclosure relates generally to the field of aircraft, and more specifically to shifting a center of gravity of an aircraft based on a change in mobility phase of the aircraft.

BACKGROUND

In different types of aircraft, the desired location of the aircraft's center of gravity —i.e., a balance location of the aircraft's mass, may depend on a variety of factors including a mobility phase in which the aircraft is operating. As one example, for an aircraft designed to operate in a hover mobility phase (e.g., a helicopter), a center of gravity of the aircraft is preferably collocated with a center of lift of the aircraft—i.e., a balance location of the aircraft's vertical thrust that enables hovering. By collocating the center of gravity with the center of lift, a load of the aircraft is equally balanced between all propulsors (e.g., rotors) of the aircraft, and the aircraft is able to provide power-efficient hovering without any one propulsor being loaded more than any other propulsor.

As another example, for an aircraft designed to operate primarily in a cruising mobility phase (e.g., a passenger jet), a center of gravity of the aircraft is preferably positioned forward in a longitudinal direction from a center of pressure of the aircraft—i.e., a balance location of upward aerodynamic loads on the aircraft in forward cruise flight. By positioning the center of gravity ahead of the center of pressure, positive static stability (i.e., static margin) is achieved while in the cruising mobility phase. Accordingly, the balance of aircraft mass and aerodynamic forces in a statically stable aircraft operates to passively reject small disturbances to pitch, thereby increasing stability and efficiency per flight phase.

SUMMARY

According to one aspect of the present disclosure, an apparatus for shifting a center of gravity of an aircraft is disclosed. The apparatus includes a propulsion component, a moveable ballast component, and an assembly configured to translate the moveable ballast component. The propulsion component is configured to assist in transitioning the aircraft between a first mobility phase and a second mobility phase. The assembly is configured to translate the moveable ballast component between an aft position and a forward position of the aircraft based on the aircraft transitioning between the first mobility phase and the second mobility phase to shift the center of gravity of the aircraft along a longitudinal axis of the aircraft.

The features, functions, and advantages that have been discussed can be achieved independently in various embodiments or may be combined in yet other embodiments, further details of which can be seen with reference to the following description and drawings.

DETAILED DESCRIPTION

Different aircraft may have differently positioned and fixed centers of gravity depending on the mobility phase in which the aircraft is designed to operate. Some aircraft are designed to transition between operation in different mobility phases, which can present issues when the center of gravity is misaligned for a particular mobility phase. For example, a vertical-take-off-and-landing (VTOL) aircraft may transition through a sequence of different mobility phases beginning with vertical takeoff, hover climb, hover, outbound transition, climb, cruise and maneuver, descent, inbound transition, hover and reserve, and vertical landing. In such a VTOL aircraft, if the center of gravity is fixed, then the aircraft is optimized for only some of the mobility phases and not the other mobility phases.

Thus, examples are disclosed that relate to shifting a center of gravity of an aircraft based on the aircraft transitioning from one mobility phase to another mobility phase. Such mobility phase-based shifting of the center of gravity allows for the center of gravity to be optimally positioned in the aircraft according to the particular mobility phase in which the aircraft is operating. As described in more detail below, the center of gravity of an aircraft can be shifted in different ways using a variety of different assemblies.

Figure 1A:
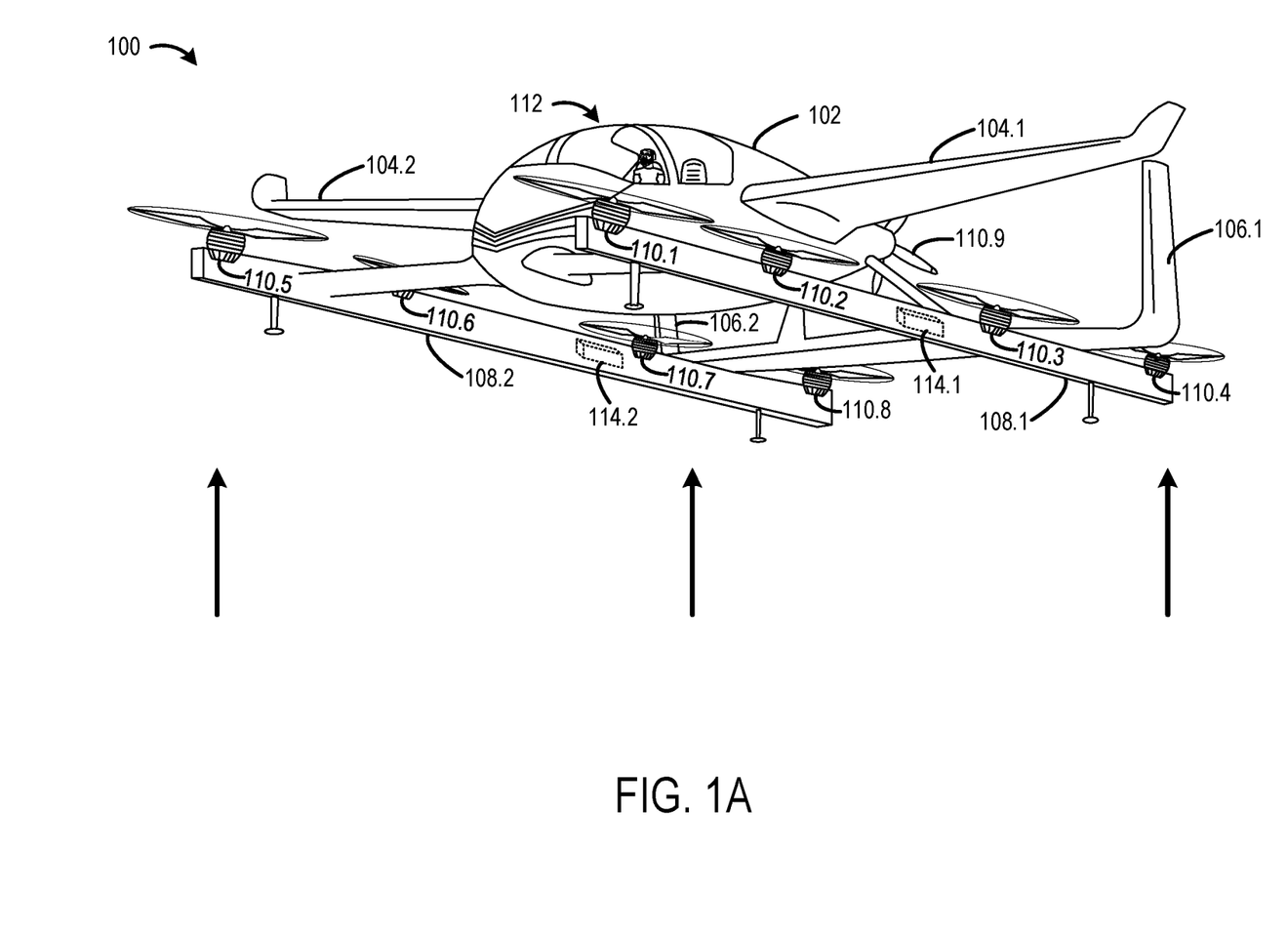
FIGS. 1A, 1B, 2A, and 2B are diagrammatic representations of an exemplary embodiment of an aircraft configured to shift a center of gravity of the aircraft based on transitioning between different phases of mobility.
Figure 1B:
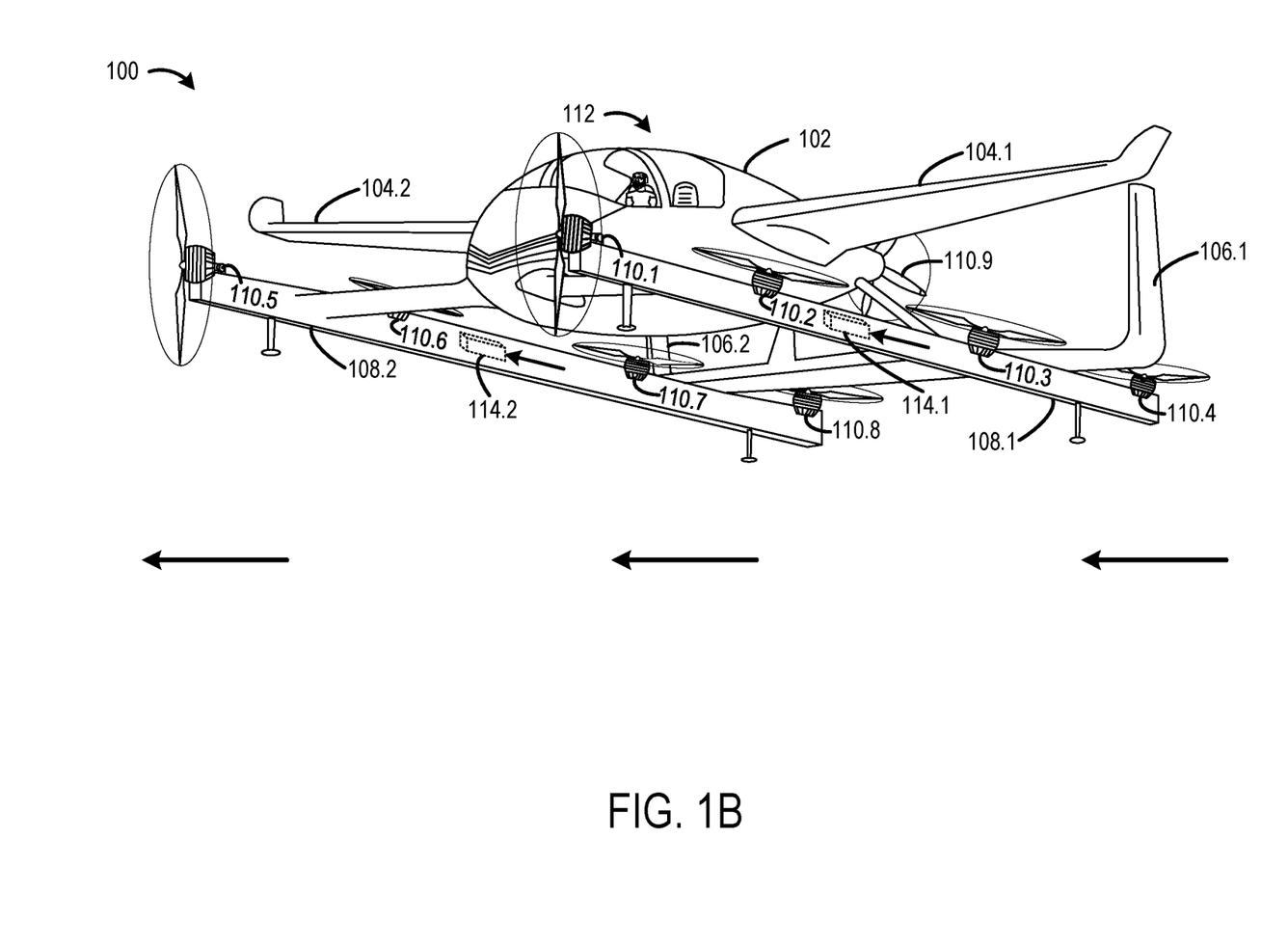
Figure 2A:
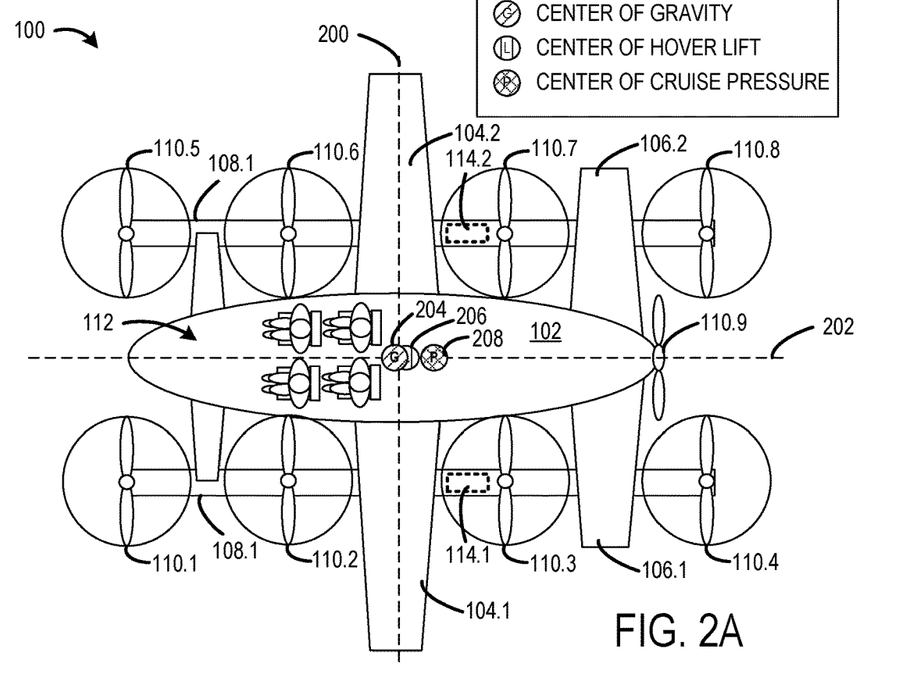
Figure 2B:
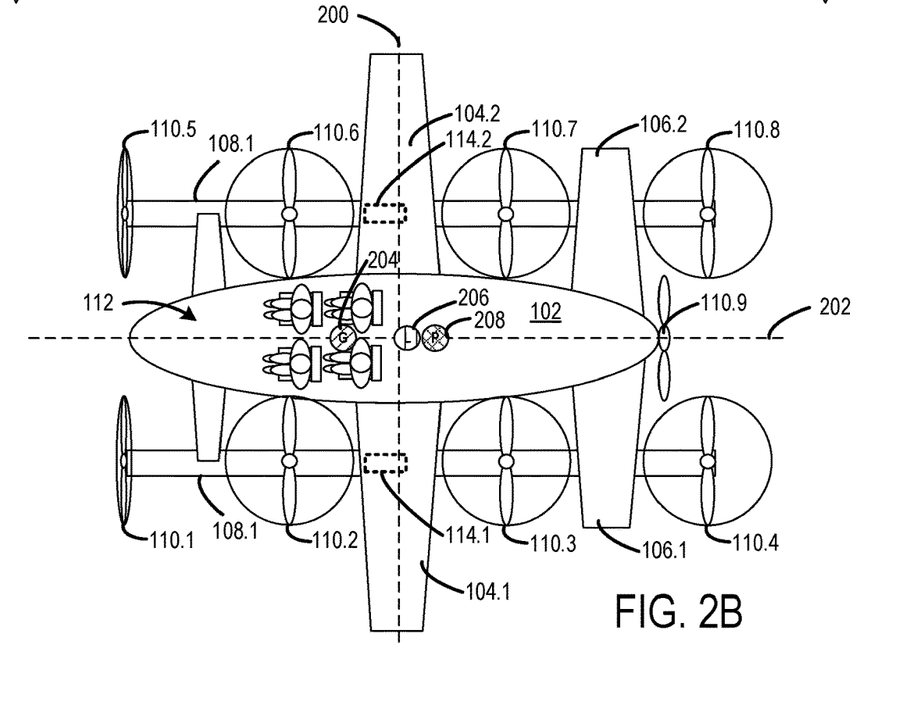

FIGS. 1A, 1B, 2A, and 2B are diagrammatic representations of an exemplary embodiment of an aircraft 100 according to examples of the present disclosure. The aircraft 100 is an exemplary embodiment of a VTOL aircraft. The aircraft 100 is configured to operate in a hover mobility phase as shown in FIGS. 1A and 2A. For example, the aircraft 100 may operate in the hover mobility phase that includes vertical take-off, hover climb, hover, hover and reserve and vertical landing. Further, the aircraft 100 is configured to transition between operating in the hover mobility phase and operating in a cruising mobility phase as shown in FIGS. 1B and 2B. Note that aircraft 100 may operate in other intermediate mobility phases when transitioning between the hover phase and the cruising phase (e.g., outbound transition, inbound transition).

The aircraft 100 comprises a fuselage 102, a pair of wings 104 (e.g., 104.1, 104.2), a pair of tail fins 106 (e.g., 106.1, 106.2) that embody an H-tail type empennage, a pair of booms 108 (e.g., 108.1, 108.2), and a plurality of rotor propulsors 110 (e.g., 110.1-110.9). In various examples, such components of the aircraft 100 may be fabricated from metal, composite materials, polymeric materials, ceramic materials, and/or combinations thereof.

The fuselage 102 comprises an interior cabin 112 that is configured to accommodate a payload, such as one or more passengers and optionally cargo. In some examples, the fuselage 102 accommodates other components related to shifting a center of gravity of the aircraft 100, as will be discussed in further detail below with reference to FIGS. 3A and 3B.

The pair of wings 104 and the pair of tail fins 106 are operatively coupled to the fuselage 102 and extend laterally from the fuselage 102 along a lateral axis 200 of the aircraft 100 (shown in FIGS. 2A and 2B). Note that the term "along" is not meant to limit the positioning of the wing and tail fins to only on the lateral axis of the aircraft. Rather, the wing and tail fins can be positioned on, beside, over, or parallel to the lateral axis of the aircraft without departing from the scope of the present description. The pair of wings 104 and the pair of tail fins 106 are configured to provide lift and stability while the aircraft 100 is moving in a forward flight direction in the cruising mobility phase. The pair of booms 108 are operatively coupled to the fuselage 102 and extend parallel to a longitudinal axis 202 of the aircraft 100 (shown in FIGS. 2A and 2B).

A plurality of propulsion components in the form of rotor propulsors 110.1-110.8 are distributed along each boom 108. In this example, the rotor propulsors 110.1, 110.2, 110.3, and 110.4 are positioned on the boom 108.1 and the rotor propulsors 110.5, 110.6, 110.7, and 110.8 are positioned on the boom 108.2. These rotor propulsors are configured to direct thrust downward relative to the fuselage 102 while the aircraft 100 is operating in the hover mobility phase. The positioning of the rotor propulsors 110 on the booms 108 may be selected to accommodate various design and flight dynamics considerations.

In the present example, a propulsion component in the form of a pusher rotor propulsor 110.9 is operatively coupled to a tail end of the fuselage 102. The pusher rotor propulsor 110.9 is configured to direct thrust rearward relative to the fuselage 102 when the aircraft 100 is operating in the cruising mobility phase. In some examples, the pusher rotor propulsor 110.9 may assist in transitioning the aircraft 100 between the hover mobility phase and the cruising mobility phase by directing thrust rearward.

The pusher rotor propulsor 110.9 can be controlled to have any suitable rotational speed to assist in transitioning the aircraft 100 between the hover mobility phase and the cruising mobility phase. In some examples, the pusher rotor propulsor 110.9 may not rotate at all when the aircraft 100 is operating in the hover mobility phase. In other examples, the pusher rotor propulsor 110.9 may rotate at a same or lesser speed than the other rotor propulsors 110 positioned on the booms 108 when the aircraft 100 is operating in the hover mobility phase. Correspondingly, in some examples, the pusher rotor propulsor 110.9 may rotate at a same or greater speed than the rotor propulsors 110 positioned on the booms 108 when the aircraft 100 is operating in the cruising mobility phase.

Additionally, the rotor propulsors 110.1 and 110.5 positioned on respective front ends of the booms 108 are configured to assist in transitioning the aircraft 100 between the hover mobility phase and the cruising mobility phase. In particular, in the illustrated embodiment, the rotor propulsors 110.1 and 110.5 are configured as tilting rotor propulsors that each pivot between an upright position in the hover mobility phase (as shown in FIGS. 1A and 2A) and a prone position in the cruising mobility phase (as shown in FIGS. 1B and 2B). In the upright position, the tilting rotor propulsors 110.1 and 110.5 provide upward thrust. In the prone position, the tilting rotor propulsors 110.1 and 110.5 provide forward or rearward thrust. During the transition between the upright position and prone position, the amount of tilt of the rotor propulsors between the upright position and the prone position controls the direction of the force (i.e. thrust) during the transition to balance and maneuver the aircraft between hover and forward cruising.

The plurality of rotor propulsors 110 may utilize any suitable type of engine, motor or other power generation mechanism. In some examples, the rotor propulsors 110 may include internal combustion engines. In other examples, the rotor propulsors 110 may include electric motors. In still other examples, the rotor propulsors 110 may include mechanical or electromechanical engines. While each boom is illustrated as having four rotor propulsors, it will be appreciated that each boom may include a greater or lesser number of rotor propulsors to achieve a desired function, such as achieving particular thrust and/or balance requirements. In some embodiments, the booms 108, the forwardly positioned rotor propulsors 110.1 and 110.5, and/or the pusher propulsor 110.9 may be omitted from the aircraft 100. In some embodiments, the forwardly positioned rotor propulsors 110.1 and 110.5 may be fixed in either the upright or prone position. In some embodiments, the aircraft 100 may include additional or alternative propulsion components, such as turbine engines. The aircraft 100 may include any suitable propulsion components to achieve VTOL capability.

As described in more detail below, to enable shifting the center of gravity 204 of the aircraft 100, a pair of moveable ballast components 114.1 and 114.2 are provided within the booms 108.1 and 108.2, respectively. Each of the moveable ballast components 114 are configured to translate linearly within the associated boom along the longitudinal axis 202 (shown in FIGS. 2A and 2B) of the aircraft 100 between an aft position (shown in FIGS. 1A and 2A) and a forward position (shown in FIGS. 1B and 2B) based on the aircraft 100 transitioning between the hover mobility phase and the cruising mobility phase. Note that the term "along" is not meant to limit the translation of the moveable ballast components 114 to only on the longitudinal axis of the aircraft. Rather, the moveable ballast components 114 can move on, beside, over, or parallel to the longitudinal axis of the aircraft without departing from the scope of the present description. Further, the movement of the pair of moveable ballast components 114 is configured to shift the position of the center of gravity 204 of the aircraft 100 linearly on the longitudinal axis 202, while not changing the center of gravity relative to the lateral axis 200 of the aircraft 100. In other words, the pair of moveable ballast components 114 may be substantially balanced to laterally align the center of gravity 204 with the longitudinal axis 202.

In some embodiments, the linear movement of the moveable ballast components 114 may be mechanically coupled to the pivoting/tilting motion of the tilt rotors 110.1 and 110.5, such that pivoting the tilt rotors 110.1 and 110.5 between the upright and prone positions causes the moveable ballast components 114 to translate linearly between the aft and forward positions within the booms 108. In other embodiments and as described in more detail below, the linear movement of the moveable ballast components 114 is not mechanically coupled to the pivoting motion of the tilt rotors 110.1 and 110.5. In these examples, the moveable ballast components 114 are translated using a separate translation assembly that is controlled in conjunction with pivoting the tilt rotors 110.1 and 110.5.

As shown in FIG. 2A, in the illustrated embodiment, when the aircraft 100 is in the hover mobility phase where the moveable ballast components 114 are in the aft position, the center of gravity 204 of the aircraft 100 is positioned proximate to a center of lift 206 of the aircraft 100 and in substantial alignment with the lateral axis 200 and the longitudinal axis 202. Also, the center of gravity 204 and the center of lift 206 are positioned slightly ahead of a center of pressure 208 of the aircraft 100. As shown in FIG. 2B, based on the aircraft 100 transitioning from the hover mobility phase to the cruise mobility phase, the moveable ballast components 114 are translated from the aft position toward a forward position to shift the center of gravity 204 of the aircraft forward. Meanwhile, the center of lift 206 and the center of pressure 208 remain in substantially the same position as when the aircraft 100 is in the hover mobility phase.

In a similar manner, when the aircraft 100 transitions from the cruising mobility phase to the hover phase, the moveable ballast components 114 are translated from the forward position (FIG. 2B) toward the aft position (FIG. 2A) based on this transition. In different examples and flight operations, the center of gravity 204 may be shifted laterally along the longitudinal axis 202 of the aircraft 100 by any suitable amount to optimize the flight dynamics of the particular mobility phase in which the aircraft is operating.

The pair of moveable ballast components 114 may take any suitable form. In some embodiments, the moveable ballast components 114 may comprise a power storage component configured to provide electrical power to one or more other components, such as one or more of the propulsion components of the aircraft 100. In some examples, a power storage component may comprise a battery or other electrical power storage device.

In other embodiments where the aircraft comprises combustion engines, the moveable ballast component may comprise a fuel tank. Further, in some embodiments, the aircraft may include multiple fuel tanks dispersed along the longitudinal axis of the aircraft, and fuel may be transferred from one fuel tank to another fuel tank to shift the center of gravity based on the aircraft transitioning from one mobility phase to another mobility phase. In still other embodiments, passengers and/or associated accommodations may be used as moveable ballast components. As one example, seats in a cabin may be translated forward or aft based on a transition from one mobility phase to another mobility phase.

The aircraft may include any suitable number of moveable ballast components that can have any suitable number of translation paths in order to shift the center of gravity along the longitudinal axis of the aircraft based on the aircraft transitioning between mobility phases.

Figure 3A:
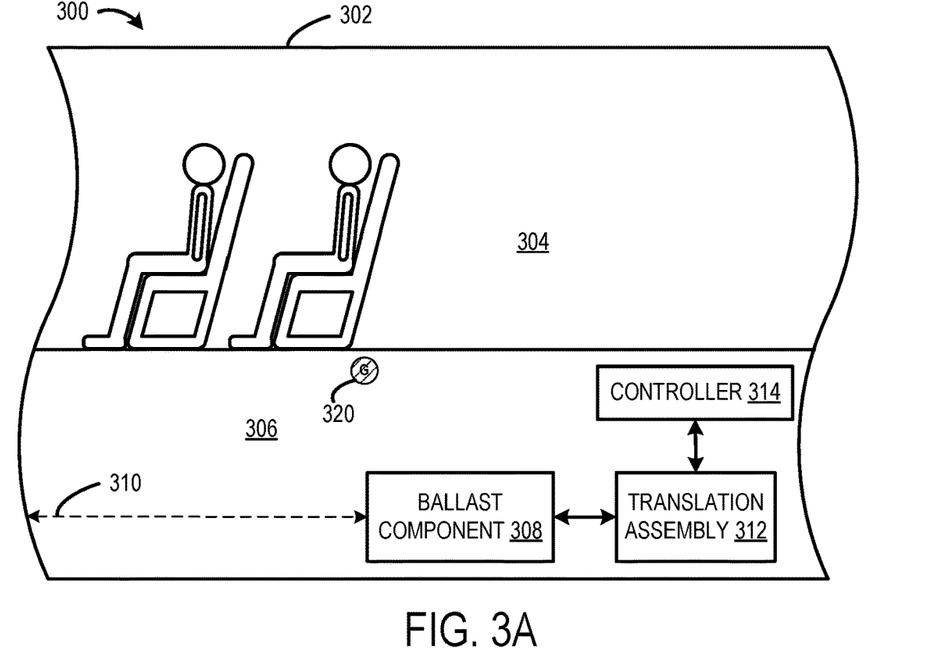
FIGS. 3A and 3B are diagrammatic representations of an exemplary embodiment of an aircraft comprising a moveable ballast component positioned in a fuselage of the aircraft.
Figure 3B:
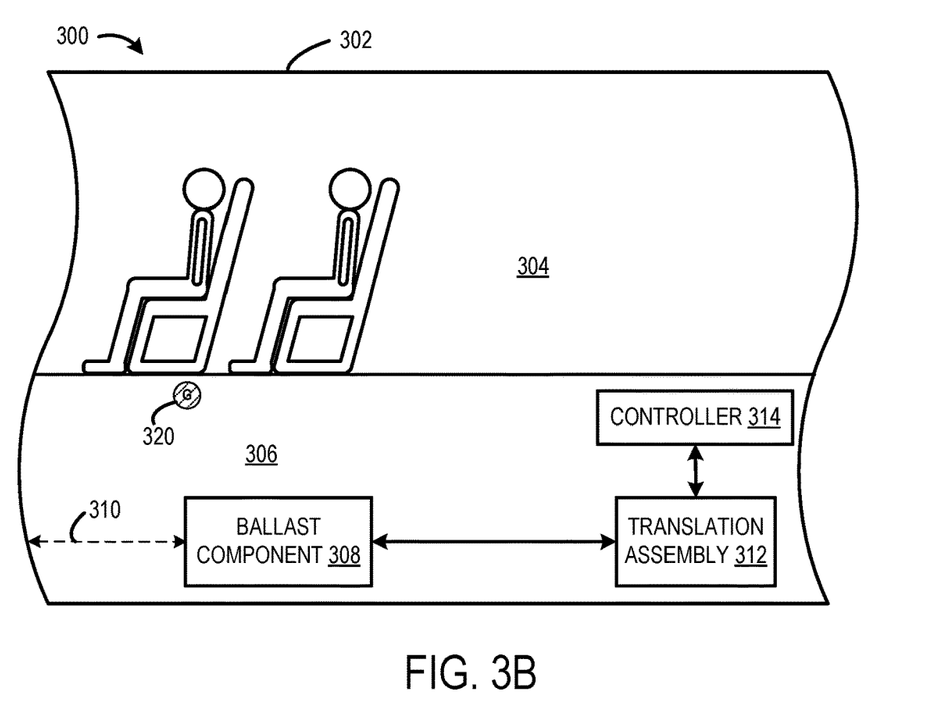

Additionally or alternatively, in some embodiments, one or more moveable ballast components may be located within a fuselage of the aircraft. FIGS. 3A and 3B diagrammatically represent an exemplary embodiment of an aircraft 300 comprising a fuselage 302. The fuselage 302 comprises an interior cabin 304 configured to accommodate passengers, and a compartment 306 positioned below the interior cabin 304. The compartment 306 contains a moveable ballast component 308 configured to move linearly between an aft position (shown in FIG. 3A) and a forward position (shown in FIG. 3B) to shift a center of gravity 320 of the aircraft 300 based on the aircraft transitioning between different mobility phases.

The moveable ballast component 308 may take any suitable form. The moveable ballast component 308 is translated along a longitudinal axis 310 of the aircraft 300 by a translation assembly 312. The translation assembly 312 may comprise any suitable mechanism that is configured to push/pull or otherwise move the moveable ballast component 308 between the aft and forward positions based on the aircraft transitioning between different mobility phases. As one example, the translation assembly 312 comprises a linear actuator, such as a servo motor that allows for precise control of the linear position of the moveable ballast component 308. The translation assembly 312 is controlled by a controller 314. In some examples, the translation assembly 312 and the controller 314 may be collectively referred to as a control system. In operation, the controller 314 is configured to dynamically control the translation assembly 312 to translate the moveable ballast component 308 along the longitudinal axis 310 of the aircraft 300 based on the aircraft 300 transitioning from one mobility phase to another mobility phase.

The controller 314 may control the translation assembly 312 to translate the moveable ballast component 308 based on the aircraft 300 transitioning from one mobility phase to another mobility phase in relation to the aerodynamic centers of the aircraft 100 (i.e., center of lift/pressure). The controller 314 may translate the moveable ballast component 308 within a window of time having any suitable temporal relationship with the transition between mobility phases. In some examples, the controller 314 may control the translation assembly 312 to translate the moveable ballast component 308 during a window of time when the aircraft 300 transitions between mobility phases. As one example, the moveable ballast component 308 may be translated from the aft position to the forward position as the tilt rotors of the aircraft pivot from the upright position to the prone position causing the aircraft 300 to transition from the hover mobility phase to the cruising mobility phase. In other examples, the controller 314 may control the translation assembly 312 to translate the moveable ballast component 308 based on the aircraft 300 transitioning between mobility phases during a window of time before or after the aircraft 300 transitions between mobility phases. For example, the moveable ballast component 308 may be translated from the aft position to the forward position after the tilt rotors pivot from the upright position to the prone position.

In some embodiments, the controller 314 is configured to control the propulsion components of the aircraft 300 to transition the aircraft 300 from one mobility phase to another mobility phase, such that the controller 314 controls both the propulsion components and translation of the moveable ballast component 308 in a coordinated fashion. In other embodiments, the controller 314 is configured to receive an indication that the aircraft 300 is transitioning from one mobility phase to another mobility phase, and to correspondingly control the translation of the moveable ballast component 308 responsive to receiving the indication. For example, such an indication may be provided by a sensor or another controller of the aircraft.

The controller 314 includes one or more processors communicatively coupled with one or more memory devices. The one or more processors are configured to execute instructions stored in the one or more memory devices. For example, the one or more processors may be configured to execute instructions that are part of one or more applications, services, programs, routines, libraries, objects, components, data structures, or other logical constructs. The one or more processors may be configured to execute software instructions. Additionally, or alternatively, the one or more processors may be configured to execute hardware or firmware instructions. The one or more processors may be single-core or multi-core, and the instructions executed thereon may be configured for sequential, parallel, and/or distributed processing. The one or more storage devices may include volatile, nonvolatile, dynamic, static, read/write, read-only, random-access, sequential-access, location-addressable, file-addressable, and/or content-addressable devices. Aspects of the one or more processors and the one or more storage devices may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

In the illustrated embodiment, the moveable ballast component 308, the translation assembly 312, and the controller 314 are located in the compartment 306 positioned below the interior cabin 304. In other embodiments, the moveable ballast component 308, the translation assembly 312, and/or the controller 314 may be positioned in another suitable location within the fuselage. In some embodiments, the controller may be located in another portion of the aircraft, such as a wing or a boom.

In the illustrated embodiment, the moveable ballast component 308 is not mechanically coupled to a propulsion component of the aircraft 300. Rather, the controller 314 controls the translation assembly 312 to translate the moveable ballast component 308 in coordination with the aircraft 300 transitioning form one mobility phase to another mobility phase. In other embodiments, the moveable ballast component may be mechanically coupled to a propulsion component of the aircraft.

FIGS. 4A-4D, 5A-5B, 6A-6B, 7A-7B, 8A-8B, and 9A-9B are diagrammatic representations of different embodiments of mechanical assemblies that mechanically couple a moveable ballast component to a moveable propulsion component, such that rotary/pivoting movement of the moveable propulsion component is tied to linear translation of the moveable ballast component. In different examples, the herein described mechanical assemblies are mounted to a fixed component of an aircraft. The mechanical assemblies may be utilized with any suitable aircraft. Regarding the example aircraft 100 shown in FIGS. 1A, 1B, 2A, and 2B, such mechanical assemblies can be mounted internally or externally to one of the booms 108 of the aircraft. In some examples, one of the mechanical assemblies may be mounted on a surface of one of the booms 108. In other examples, one of the mechanical assemblies may be at least partially contained within one of the booms 108. The mechanical assemblies may be mounted to any suitable component of an aircraft. Moreover, any suitable number of such mechanical assemblies may be employed in the aircraft. For example, one or more instances of the mechanical assemblies may be mounted to each of the booms 108 of the aircraft 100.

FIGS. 4A-4D are diagrammatic representations of an exemplary embodiment of an apparatus 400 comprising a four-bar linkage 402 for shifting a center of gravity of an aircraft. The four-bar linkage 402 is mounted to a fixed component 404 of an aircraft. A tilting rotor propulsor 406 is mounted on a forward end 408 of the four-bar linkage 402. A moveable ballast component 410 is mounted to the upper horizontal bar 416 proximate to an aft end 412 of the four-bar linkage 402 opposite the forward end 408. The moveable ballast component 410 may take any suitable form as described above. As one example, the moveable ballast component 410 comprises a battery configured to provide power to the tilting rotor propulsor 406. In some embodiments, the moveable ballast component 410 may comprise an aerodynamic fairing.

The four-bar linkage 402 comprises a plurality of bars coupled together via a plurality of corresponding revolute joints. The four-bar linkage 402 is configured to transition between an upright position shown in the side view of FIG. 4A and top view of FIG. 4B, and a prone position shown in the side view of FIG. 4C and the top view of FIG. 4D. In the upright position of FIGS. 4A and 4B, the tilting rotor propulsor 406 can provide upward or downward thrust for a hover mobility phase of the aircraft. In this upright position, the moveable ballast component 410 assumes an aft position that aligns a center of gravity of the aircraft with a center of hover of the aircraft.

Figure 4A:
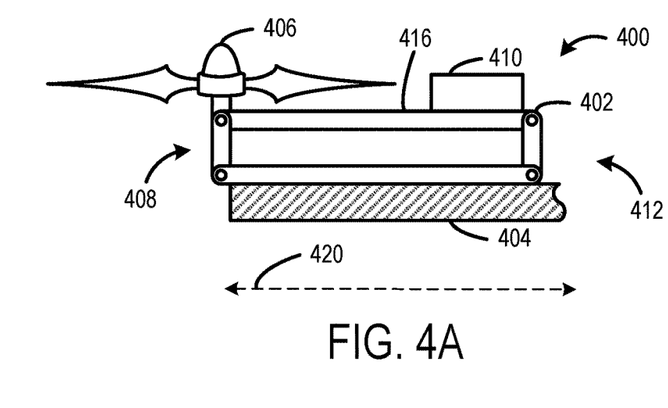
FIGS. 4A-4D are diagrammatic representations of an exemplary embodiment of an apparatus for shifting a center of gravity of an aircraft comprising a four-bar linkage.
Figure 4B:
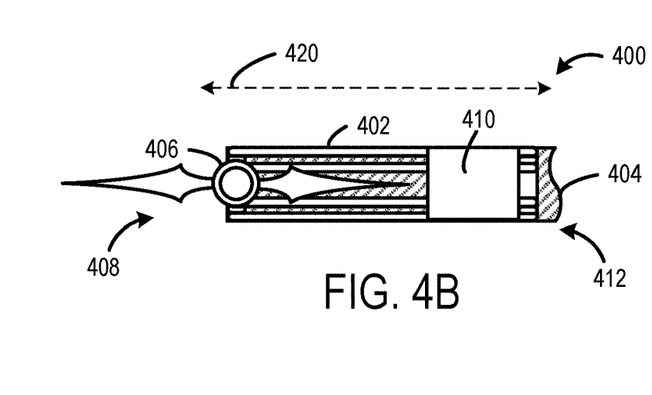
Figure 4C:
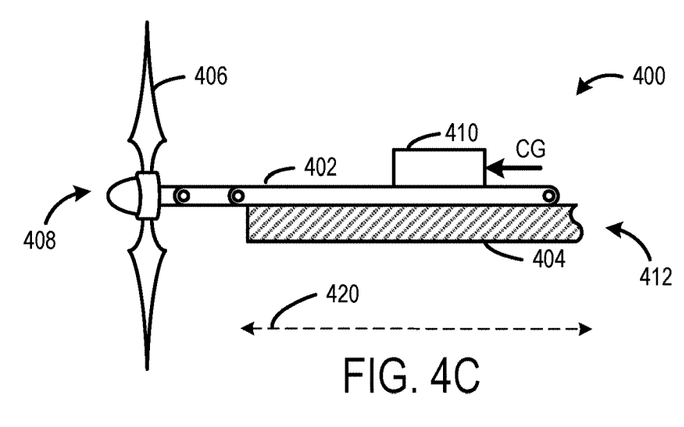
Figure 4D:
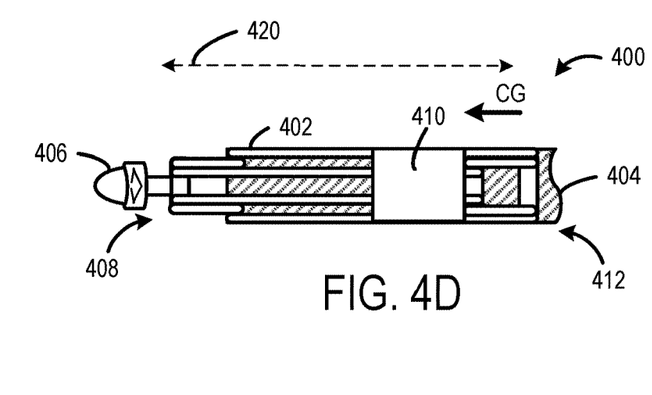

The four-bar linkage 402 transitions from the upright position to the prone position of FIGS. 4C and 4D by rotating the shorter bars of the four-bar linkage from a vertical orientation to a horizontal orientation. Such rotation of the shorter bars of the four-bar linkage 402 causes the tilting rotor propulsor 406 to pivot from the upright position to a forward-facing prone position shown in FIGS. 4C and 4D. In the prone position, the tilting rotor propulsor 406 can provide forward or rearward thrust for a cruising mobility phase of the aircraft. Additionally, such rotation of the shorter bars of the four-bar linkage 402 causes the moveable ballast component 410 to translate along a longitudinal axis 420 of the aircraft from the aft position to a forward position, which causes the center of gravity (CG) of the aircraft to shift forward (i.e., leftward on the page). In other words, the pivoting motion of the tilt rotor propulsor 406 is mechanically coupled to the linear motion of the moveable ballast component 410 along the longitudinal axis 420 via the four-bar linkage 402.

Figure 5A:
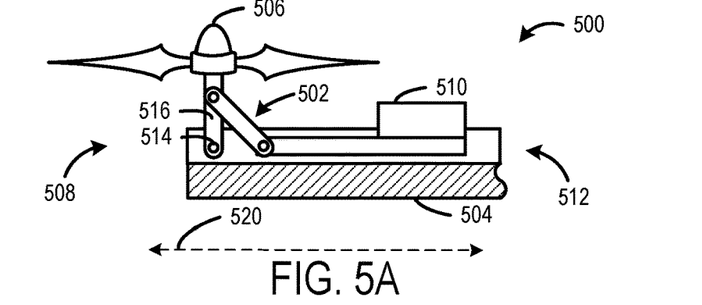
FIGS. 5A-5B are diagrammatic representations of an exemplary embodiment of an apparatus for shifting a center of gravity of an aircraft comprising a slider crank mechanism.
Figure 5B:
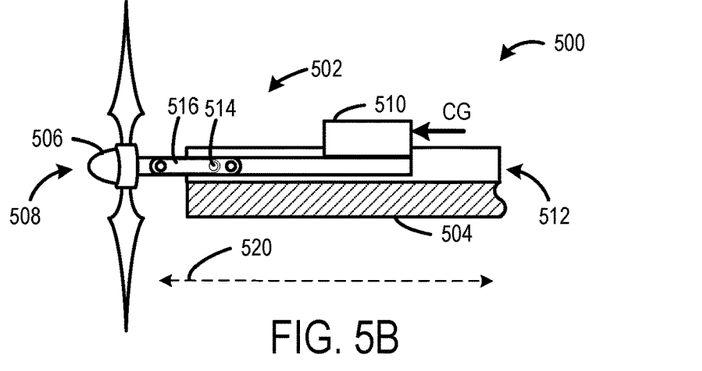

FIGS. 5A-5B are diagrammatic representations of an exemplary embodiment of an apparatus 500 for shifting a center of gravity of an aircraft comprising a slider crank mechanism 502. The apparatus 500 is mounted to a fixed component 504 of an aircraft. A tilting rotor propulsor 506 is mounted on a forward end 508 of the slider crank mechanism 502. A moveable ballast component 510 is mounted proximate to an aft end 512 of the slider crank mechanism 502 opposite the forward end 508.

The slider crank mechanism 502 comprises a plurality of bars coupled together via a plurality of corresponding revolute joints and a rocker joint 514 coupled to a rocker arm 516. The rocker joint 514 is configured to rotate and is translationally fixed. The slider crank mechanism 502 is configured to transition the between an upright position shown in FIG. 5A and a prone position shown in FIG. 5B.

In the upright position, the tilting rotor propulsor 506 and the rocker arm 516 assume an upright position, such that the tilting rotor propulsor 506 can provide upward or downward thrust for a hover mobility phase of the aircraft. In the upright position, the moveable ballast component 510 is positioned in an aft position that aligns a center of gravity of the aircraft with a center of hover of the aircraft. The slider crank mechanism 502 transitions from the upright position to the prone position of FIG. 5B by rotating the rocker arm 516 forward about the rocker joint 514 such that rocker arm pivots from a vertical position to the prone position. Such rotation of the rocker arm 516 causes the tilting rotor propulsor 506 to pivot from the upright position to a forward-facing prone position. In the prone position shown in FIG. 5B, the tilting rotor propulsor 506 can provide forward or rearward thrust for a cruising mobility phase of the aircraft. Additionally, such rotation of the rocker arm 516 causes the moveable ballast component 510 to translate along a longitudinal axis 520 of the aircraft from the aft position to a forward position via the slider crank mechanism 502, which causes the center of gravity (CG) of the aircraft to shift forward (i.e., leftward on the page). In other words, the pivoting motion of the tilting rotor propulsor 506 is mechanically coupled to the linear motion of the moveable ballast component 510 along the longitudinal axis 520 via the slider crank mechanism 502.

Figure 6A:
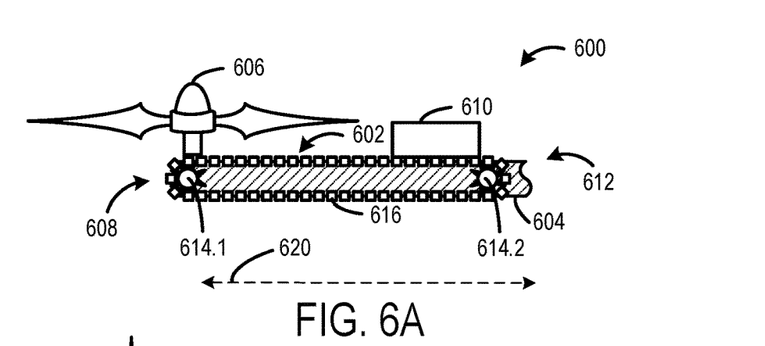
FIGS. 6A-6B are diagrammatic representations of an exemplary embodiment of an apparatus for shifting a center of gravity of an aircraft comprising a chain and sprocket mechanism.
Figure 6B:
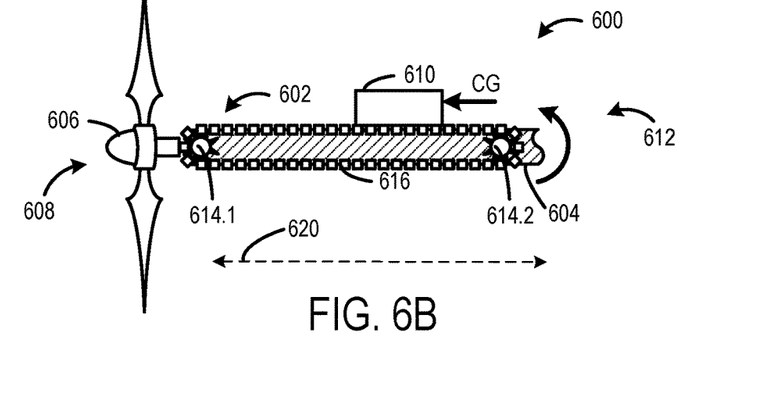

FIGS. 6A-6B are diagrammatic representations of an exemplary embodiment of an apparatus 600 for shifting a center of gravity of an aircraft comprising a chain and sprocket mechanism 602. The apparatus 600 is mounted to a fixed component 604 of an aircraft. A tilting rotor propulsor 606 is mounted to chain 616 on a forward end 608 of the chain and sprocket mechanism 602. A moveable ballast component 610 is mounted to an upper portion of chain 616 proximate to an aft end 612 of the chain and sprocket mechanism 602 that is opposite the forward end 608.

The chain and sprocket mechanism 602 comprises a pair of sprockets 614.1 and 614.2 and a chain 616 wrapped around the pair of sprockets. The chain and sprocket mechanism 602 is configured to transition the tilting rotor propulsor 606 between an upright position shown in FIG. 6A and a prone position shown in FIG. 6B. In the upright position, the tilting rotor propulsor 606 can provide upward or downward thrust for a hover mobility phase of the aircraft. In the upright position of FIG. 6A, the moveable ballast component 610 is located in an aft position that aligns a center of gravity of the aircraft with a center of hover of the aircraft.

The chain and sprocket mechanism 602 transitions the tilting rotor propulsor 606 from the upright position to the prone position by rotating the pair of sprockets 614.1 and 614.2 in a counter-clockwise direction that causes the upper portion of chain 616 to translate along the longitudinal axis 620 of the aircraft. Such translation of the chain 616 causes the tilting rotor propulsor 606 to pivot from the upright position to a forward-facing prone position shown in FIG. 6B. In the prone position, the tilting rotor propulsor 606 can provide forward or rearward thrust for a cruising mobility phase of the aircraft. Additionally, such translation of the chain 616 causes the moveable ballast component 610 to translate linearly from the aft position to a forward position via the chain and sprocket mechanism 602, which causes the center of gravity (CG) of the aircraft to shift forward (i.e., leftward on the page). In other words, the pivoting motion of the tilting rotor propulsor 606 is mechanically coupled to the linear motion of the moveable ballast component 610 via the chain and sprocket mechanism 602.

Figure 7A:
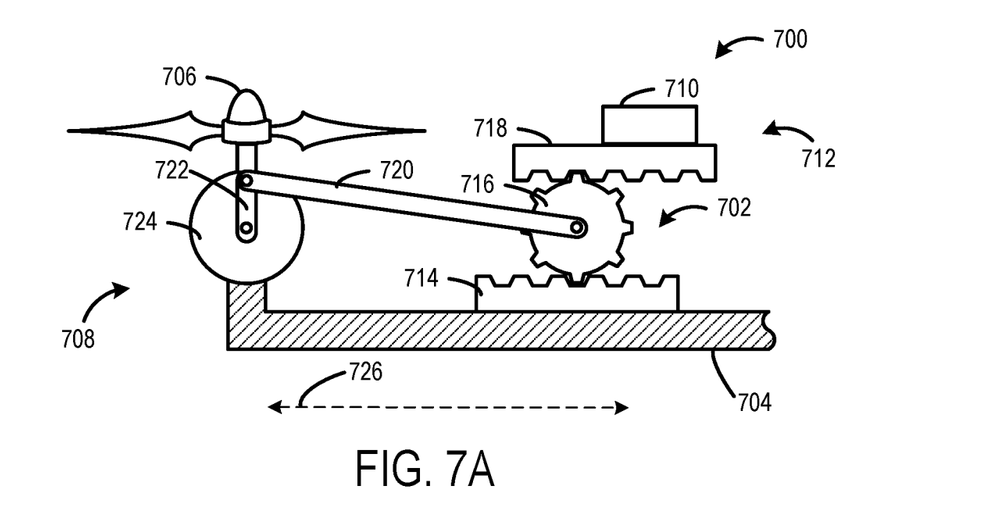
FIGS. 7A-7B are diagrammatic representations of an exemplary embodiment of an apparatus for shifting a center of gravity of an aircraft comprising a rack gear drive mechanism.
Figure 7B:
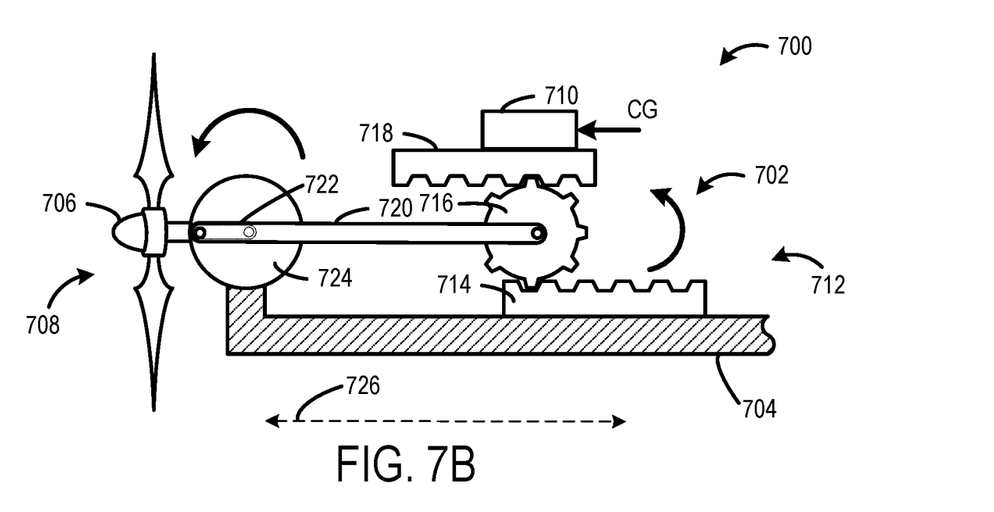

FIGS. 7A-7B are diagrammatic representations of an exemplary embodiment of an apparatus 700 for shifting a center of gravity of an aircraft comprising a rack gear drive mechanism 702. Portions of the apparatus 700 are mounted to a fixed component 704 of an aircraft. A tilting rotor propulsor 706 is mounted on a forward end 708 of the rack gear drive mechanism 702. A moveable ballast component 710 is mounted to a moveable rack 718 proximate to an aft end 712 of the rack gear drive mechanism 702 opposite the forward end 708.

The rack gear drive mechanism 702 comprises a fixed rack 714, a gear 716, a moveable rack 718, a rod 720, a crank 722, and a drive shaft 724. The rack gear drive mechanism 702 is configured to transition between an upright position shown in FIG. 7A and a prone position shown in FIG. 7B. In the upright position, the tilting rotor propulsor 706 assumes an upright position on the drive shaft 724, such that the tilting rotor propulsor 706 can provide upward or downward thrust for a hover mobility phase of the aircraft. In the upright position, the moveable ballast component 710 and moveable rack 718 are located in an aft position that aligns a center of gravity of the aircraft with a center of hover of the aircraft.

The rack gear drive mechanism 702 transitions from the upright position to the prone position by rotating the drive shaft 724 causing the crank 722 to rotate and translate the rod 720 in the X-axis direction. Translation of the rod 720 correspondingly causes translation and rotation of the gear 716 and translation of the moveable rack 718. Such rotation of the drive shaft 724 causes the tilting rotor propulsor 706 to pivot from the upright position to a forward-facing prone position. In the prone position, the tilting rotor propulsor 706 can provide forward or rearward thrust for a cruising mobility phase of the aircraft. Additionally, such translation of the moveable rack 718 causes the moveable ballast component 710 to translate linearly from the aft position to a forward position via the rack gear drive mechanism 702, which causes the center of gravity (CG) of the aircraft to shift forward (i.e., leftward on the page). In other words, the pivoting motion of the tilting rotor propulsor 706 is mechanically coupled to the linear motion of the moveable ballast component 710 along the longitudinal axis 726 of the aircraft via the rack gear drive mechanism 702. Note that the rack gear drive mechanism 702 provides a stroke-doubling mechanism that advantageously yields a larger translation range of the center of gravity if such a range is desired.

Figure 8A:
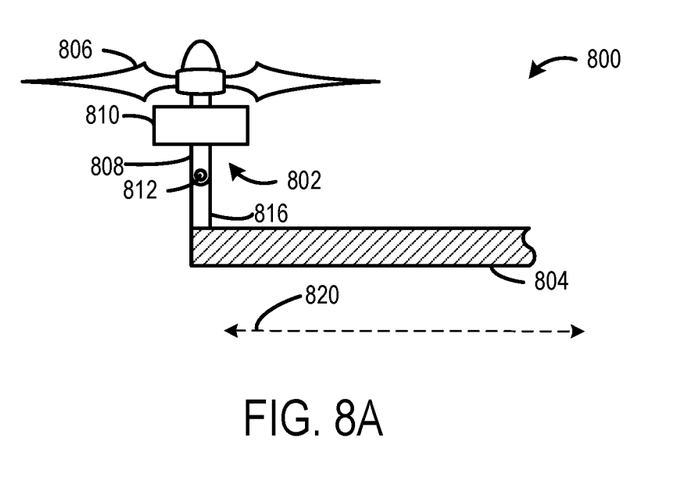
FIGS. 8A-8B are diagrammatic representations of an exemplary embodiment of an apparatus for shifting a center of gravity of an aircraft comprising a tilting rotor mechanism.
Figure 8B:
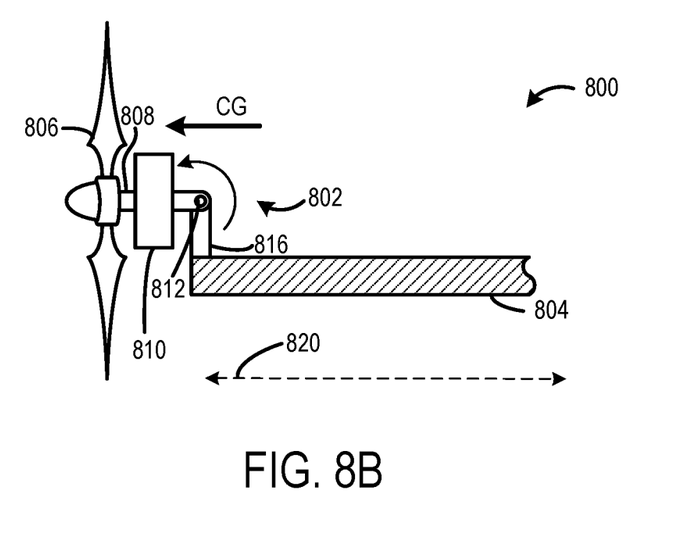

FIGS. 8A-8B are diagrammatic representations of an exemplary embodiment of an apparatus 800 for shifting a center of gravity of an aircraft comprising a tilting rotor mechanism 802. The apparatus 800 is mounted to a fixed component 804 of an aircraft. A tilting rotor propulsor 806 is mounted on a distal end of a shaft 808. Shaft 808 is rotatably coupled to a stanchion 816 that extends from the fixed component 804. A moveable ballast component 810 is mounted intermediate the tilting rotor propulsor 806 and a pivot 812 that rotatably couples the shaft 808 to the stanchion 812.

The tilting rotor mechanism 802 is configured to transition between an upright position shown in FIG. 8A and a prone position shown in FIG. 8B. In the upright position, the shaft 808 assumes an upwardly-extending position substantially collinear with the stanchion 812, such that the tilting rotor propulsor 806 can provide upward or downward thrust for a hover mobility phase of the aircraft. The tilting rotor mechanism 802 transitions from the upright position to the prone position by rotating shaft 808 about the pivot 812 to cause corresponding rotation of the tilting rotor propulsor 806 and the moveable ballast component 810.

Such rotation about the pivot 812 causes the tilting rotor propulsor 806 to pivot from the upright position to a forward-facing prone position. In the prone position, the tilting rotor propulsor 806 can provide forward or rearward thrust for a cruising mobility phase of the aircraft. Additionally, such rotation about the pivot 812 causes the moveable ballast component 810 to not only rotate but also translate linearly forward direction along the longitudinal axis 820 of the aircraft, which causes the center of gravity (CG) of the aircraft to also shift forward (i.e., leftward on the page). In other words, the rotary motion of the propulsor about pivot 812 causes corresponding motion of the moveable ballast component 810 via the tilting rotor mechanism 802. In embodiments where the moveable ballast component 810 is a battery that provides power to the tilt rotor propulsor, the tilting rotor mechanism has the added benefit of reduced power harness mass, since the battery is in close proximity to the rotor propulsor being driven by the battery.

Figure 9A:
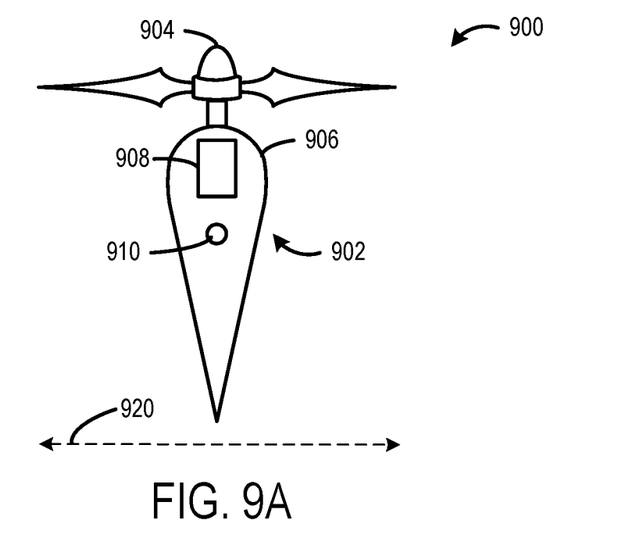
FIGS. 9A-9B are diagrammatic representations of an exemplary embodiment of an apparatus for shifting a center of gravity of an aircraft comprising a tilt wing mechanism.
Figure 9B:
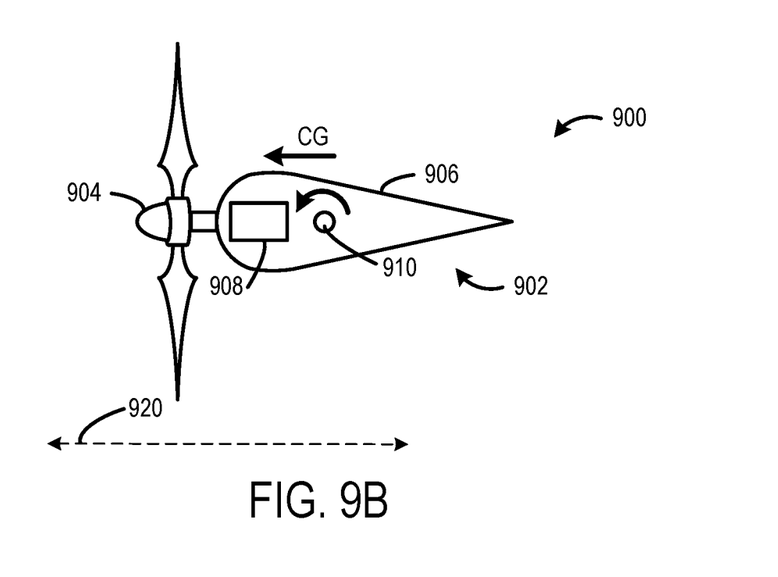

FIGS. 9A-9B are diagrammatic representations of an exemplary embodiment of an apparatus 900 for shifting a center of gravity of an aircraft comprising a tilt wing mechanism 902. A rotor propulsor 904 is mounted on a leading edge of a wing 906 in a fixed position relative to the wing 906 (i.e., the rotor propulsor 904 does not tilt relative to the wing 906). A moveable ballast component 908 is mounted within the wing 906 intermediate the rotor propulsor 904 and a pivot 910.

The tilt wing mechanism 902 is configured to transition between an upright position shown in FIG. 9A and a prone position shown in FIG. 9B. In the upright position, the rotor propulsor 904 can provide upward or downward thrust for a hover mobility phase of the aircraft. The tilt wing mechanism 902 transitions from the upright position to the prone position by rotating about the pivot 910 causing rotation of the wing 906, and correspondingly rotation of the rotor propulsor 904 and the moveable ballast component 908. Such rotation of the wing 906 causes the rotor propulsor 904 to rotate from the upright position to a forward-facing prone position. In the prone position, the rotor propulsor 906 can provide forward or rearward thrust for a cruising mobility phase of the aircraft. Additionally, since the movable ballast component 908 is positioned intermediate the leading edge of the wing 906 and the pivot 910, such rotation about the pivot 910 causes the moveable ballast component 910 to not only rotate but also translate linearly in the X-axis direction along the longitudinal axis 920 of the aircraft, which causes the center of gravity (CG) of the aircraft to also shift forward (i.e., leftward on the page). In other words, the rotary motion of the wing 906 about pivot 910 causes corresponding motion of the moveable ballast component 908 via the tilt wing mechanism 902. In embodiments where the moveable ballast component 908 is a battery providing power to the rotor propulsor 904, the tilt wing mechanism 902 has the added benefit of reduced power harness mass, since the battery is in close proximity to the rotor propulsor being driven by the battery.

The above described apparatuses provide different variable geometry mechanisms to change the center of gravity of an aircraft. Such variable geometry mechanisms mechanically couple translational movement of a moveable ballast component to rotary movement of tilting rotor propulsors or wings of the aircraft. In this way, the center of gravity of the aircraft automatically shifts as the rotor propulsors tilt for the different mobility phases. Such mechanisms can be linked to single rotor propulsors, and thus can be redundant in multi-rotor propulsor embodiments to increase error tolerance of an aircraft.

Figure 10:
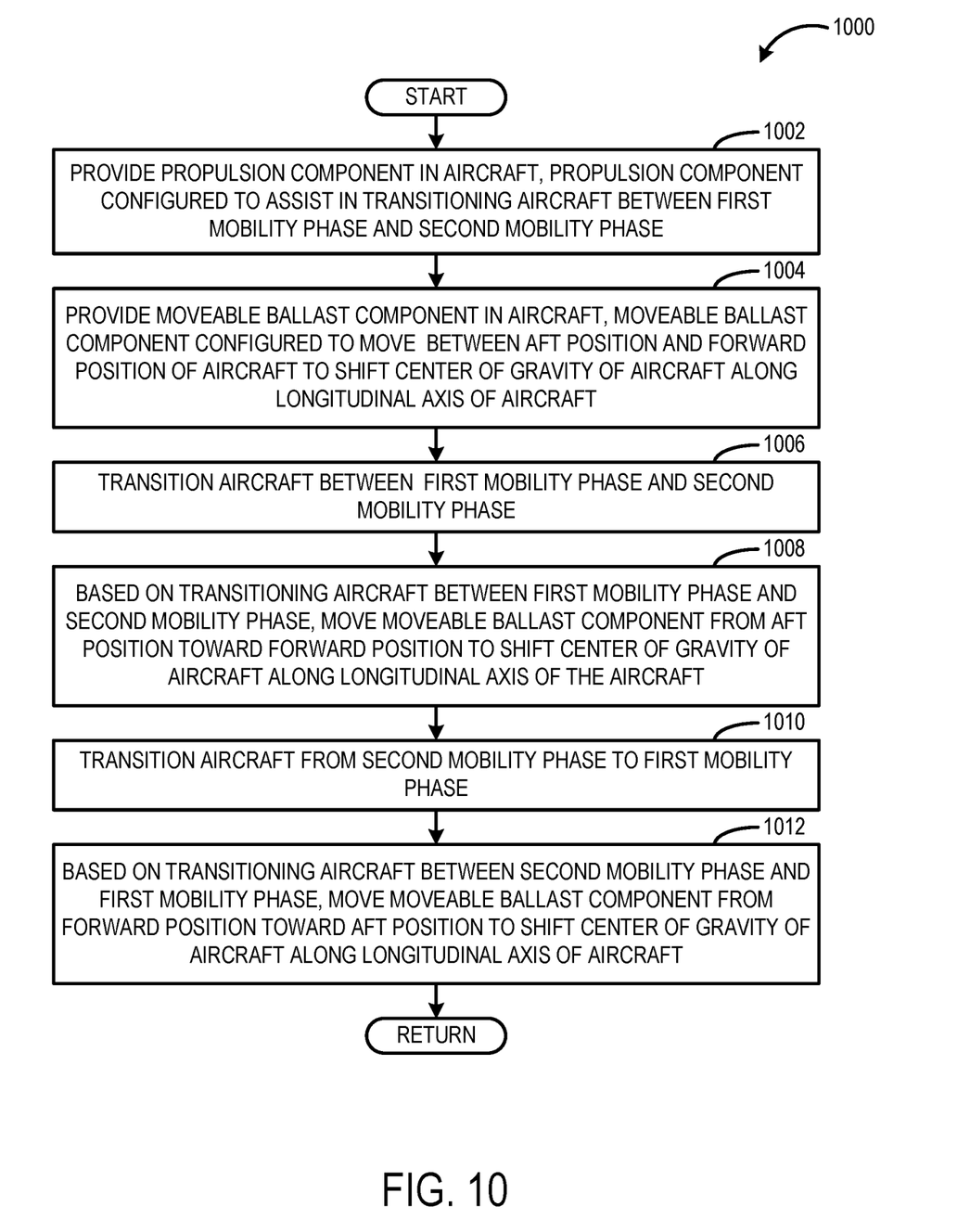
FIG. 10 is a flowchart of an exemplary embodiment of a method for shifting a center of gravity of an aircraft.

FIG. 10 is a flowchart of an example method 1000 of shifting a center of gravity of an aircraft. For example, the method 1000 may be performed by the controller 314 shown in FIGS. 3A and 3B.

At 1002, the method 1000 includes providing a propulsion component in an aircraft. The propulsion component may take any suitable form. In some examples, the propulsion component includes a tilting rotor configured to move between an upright position and a prone position. In some examples, the tilting rotor is fixed to a tilt wing of the aircraft. In other examples, the tilting rotor is not fixed to a wing of the aircraft. The propulsion component is configured to assist in transitioning the aircraft between a first mobility phase and a second mobility phase. For example, the first mobility phase may include a hover (or vertical takeoff or vertical landing) phase and the second mobility phase may include a cruising phase.

At 1004, the method 1000 includes providing a moveable ballast component in the aircraft. The moveable ballast component is configured to move along a longitudinal axis of the aircraft between an aft position and a forward position of the aircraft to shift the center of gravity of the aircraft. For example, the moveable ballast component may include a power storage component configured to provide power to the propulsion component. As one example, the power storage component may include a battery. As another example, the power storage component may include liquid or solid fuel that may be combusted or otherwise consumed to provide power to the propulsion component.

At 1006, the method 1000 includes transitioning the aircraft from the first mobility phase to the second mobility phase. At 1008, the method 1000 includes, based on transitioning the aircraft from the first mobility phase to the second mobility phase, moving the moveable ballast component from the aft position toward the forward position to shift the center of gravity of the aircraft along the longitudinal axis of the aircraft.

In some embodiments, the aircraft may include an assembly configured to translate the moveable ballast component to shift the center of gravity of the aircraft along a longitudinal axis of the aircraft between the aft position and the forward position of the aircraft. The aircraft may include any suitable assembly to translate the ballast component to shift the center of gravity of the aircraft along the longitudinal axis of the aircraft. For example, the assembly may include a rack gear drive mechanism, a chain and sprocket mechanism, a slider crank mechanism, or a four-bar linkage.

At 1010, the method 1000 includes transitioning the aircraft from the second mobility phase to the first mobility phase. At 1012, the method 1000 includes, based on transitioning the aircraft from the second mobility phase to the first mobility phase, moving the moveable ballast component from the forward position toward the aft position to shift the center of gravity of the aircraft along the longitudinal axis of the aircraft.

The concepts described herein are broadly applicable to any suitable type of aircraft, including VTOL aircraft with or without fixed wings, and manned and unmanned aircraft. Additionally, the concepts described herein may be broadly applicable to any suitable type of mobility phase of an aircraft beyond hover and cruising mobility phases.

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

The invention claimed is:

1. An apparatus for shifting a center of gravity of an aircraft, the apparatus comprising:
  a moveable propulsion component configured to assist in transitioning the aircraft between a first mobility phase and a second mobility phase; and
  an assembly configured to translate a moveable ballast component between an aft position and a forward position of the aircraft based on the aircraft transitioning between the first mobility phase and the second mobility phase to shift the center of gravity of the aircraft along a longitudinal axis of the aircraft, wherein the moveable ballast component is mechanically coupled to the moveable propulsion component such that movement of the moveable propulsion component causes linear translation of the moveable ballast component.

2. The apparatus of claim 1, wherein the moveable ballast component comprises a power storage component configured to provide power to the moveable propulsion component.

3. The apparatus of claim 1, wherein the moveable propulsion component comprises a tilting rotor configured to move between an upright position in the first mobility phase and a prone position in the second mobility phase.

4. The apparatus of claim 1, wherein the assembly comprises a rack gear drive mechanism, a chain and sprocket mechanism, a slider crank mechanism, or a four-bar linkage.

5. The apparatus of claim 1, wherein the moveable ballast component is positioned in a fuselage of the aircraft.

6. An aircraft, comprising:
  a moveable propulsion component configured to assist in transitioning the aircraft between a first mobility phase and a second mobility phase;
  a moveable ballast component configured to move between an aft position and a forward position of the aircraft, wherein the moveable ballast component is mechanically coupled to the moveable propulsion component such that movement of the moveable propulsion component causes linear translation of the moveable ballast component; and
  a control system configured to shift a center of gravity of the aircraft by moving the ballast component between the aft position and the forward position when the aircraft transitions between the first mobility phase and the second mobility phase.

7. The aircraft of claim 6, wherein the control system is configured to move the moveable ballast component linearly from the forward position toward the aft position when the aircraft transitions from the second mobility phase into the first mobility phase.

8. The aircraft of claim 6, wherein the first mobility phase is a hover phase and the second mobility phase is a cruising phase.

9. The aircraft of claim 8, wherein the control system substantially aligns the center of gravity with a center of hover lift of the aircraft in the hover phase, and the control system positions the center of gravity ahead of a center of cruise pressure of the aircraft in the cruising phase.

10. The aircraft of claim 6, wherein the moveable ballast component comprises a power storage component configured to provide power to the moveable propulsion component.

11. The aircraft of claim 10, wherein the moveable propulsion component comprises a tilting rotor configured to move between an upright position in the first mobility phase and a prone position in the second mobility phase.

12. The aircraft of claim 6, further comprising a fuselage, wherein the moveable ballast component is positioned in the fuselage.

13. The aircraft of claim 6, further comprising an assembly configured to translate the moveable ballast component between the aft position and the forward position of the aircraft, wherein the assembly comprises a rack gear drive mechanism, a chain and sprocket mechanism, a slider crank mechanism, or a four-bar linkage.

14. A method of shifting a center of gravity of an aircraft, the method comprising:
  providing a moveable propulsion component in the aircraft, the moveable propulsion component configured to assist in transitioning the aircraft between a first mobility phase and a second mobility phase;
  providing a moveable ballast component in the aircraft, the moveable ballast component configured to move between an aft position and a forward position of the aircraft to shift the center of gravity of the aircraft along a longitudinal axis of the aircraft, wherein the moveable ballast component is mechanically coupled to the moveable propulsion component such that movement of the moveable propulsion component causes linear translation of the moveable ballast component;
  transitioning the aircraft between the first mobility phase and the second mobility phase; and
  based on transitioning the aircraft between the first mobility phase and the second mobility phase, moving the moveable ballast component between the aft position and the forward position to shift the center of gravity of the aircraft along the longitudinal axis of the aircraft.

15. The method of claim 14, further comprising:
  based on transitioning the aircraft between the second mobility phase and the first mobility phase, moving the moveable ballast component from the forward position toward the aft position to shift the center of gravity of the aircraft along the longitudinal axis of the aircraft.

16. The method of claim 14, wherein the moveable ballast component is moved from the aft position toward the forward position during the transition from the first mobility phase to the second mobility phase.

17. The method of claim 14, wherein the first mobility phase is a hover phase and the second mobility phase is a cruising phase.

18. The method of claim 14, wherein the moveable ballast component comprises a power storage component configured to provide power to the propulsion component.

19. The method of claim 14, wherein the moveable propulsion component comprises a tilting rotor configured to move between an upright position and a prone position.

20. The method of claim 14, further comprising providing the moveable ballast component in a fuselage of the aircraft.

* * * * *